Aug. 29, 1967  J. E. FOLDESSY  3,338,297
APPARATUS FOR BENDING A CASTING HAVING A LIQUID CORE
Filed March 6, 1964  10 Sheets-Sheet 1

INVENTOR.
JUSTIN E. FOLDESSY
BY Donald G. Dalton
ATTORNEY

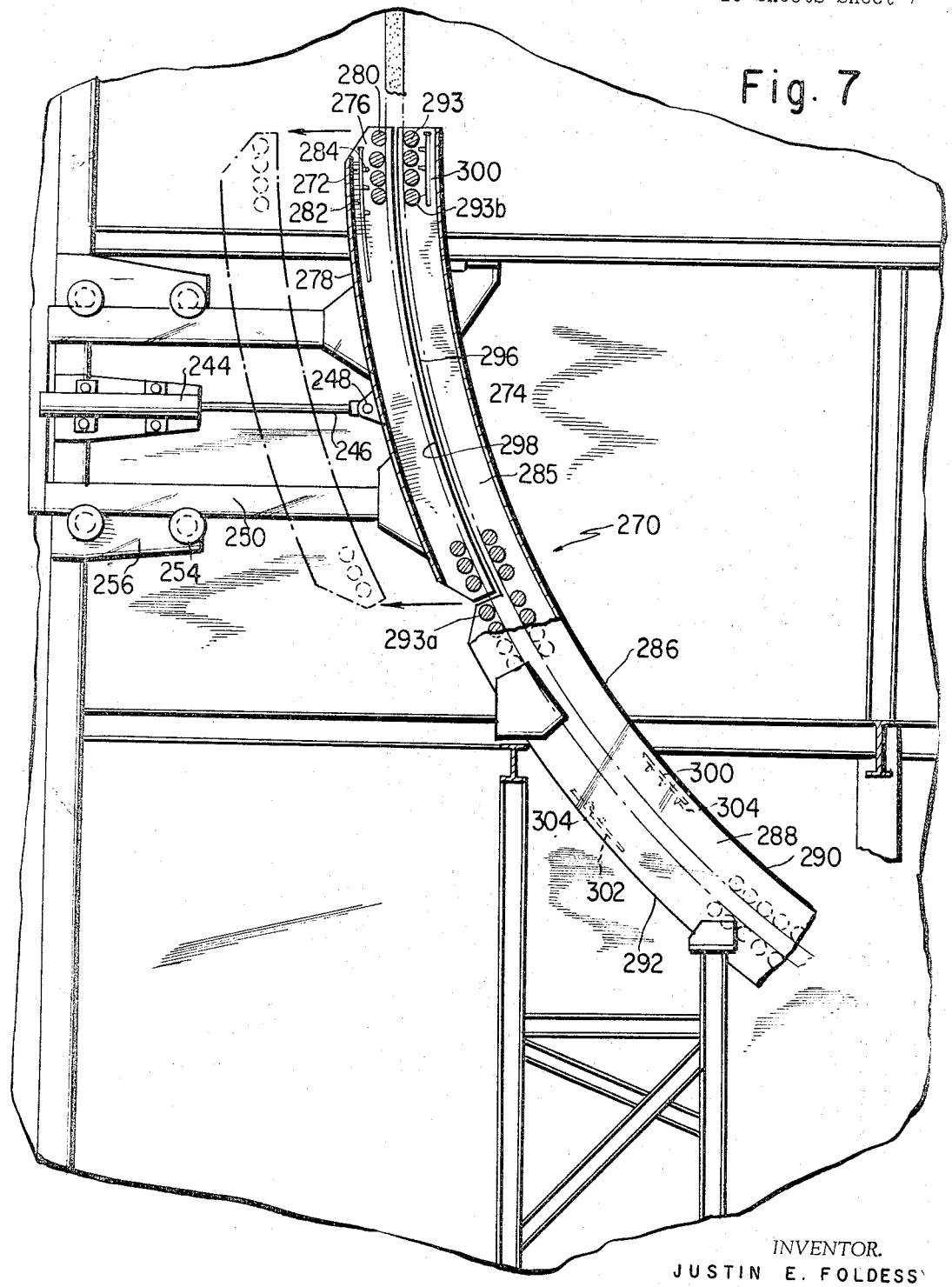

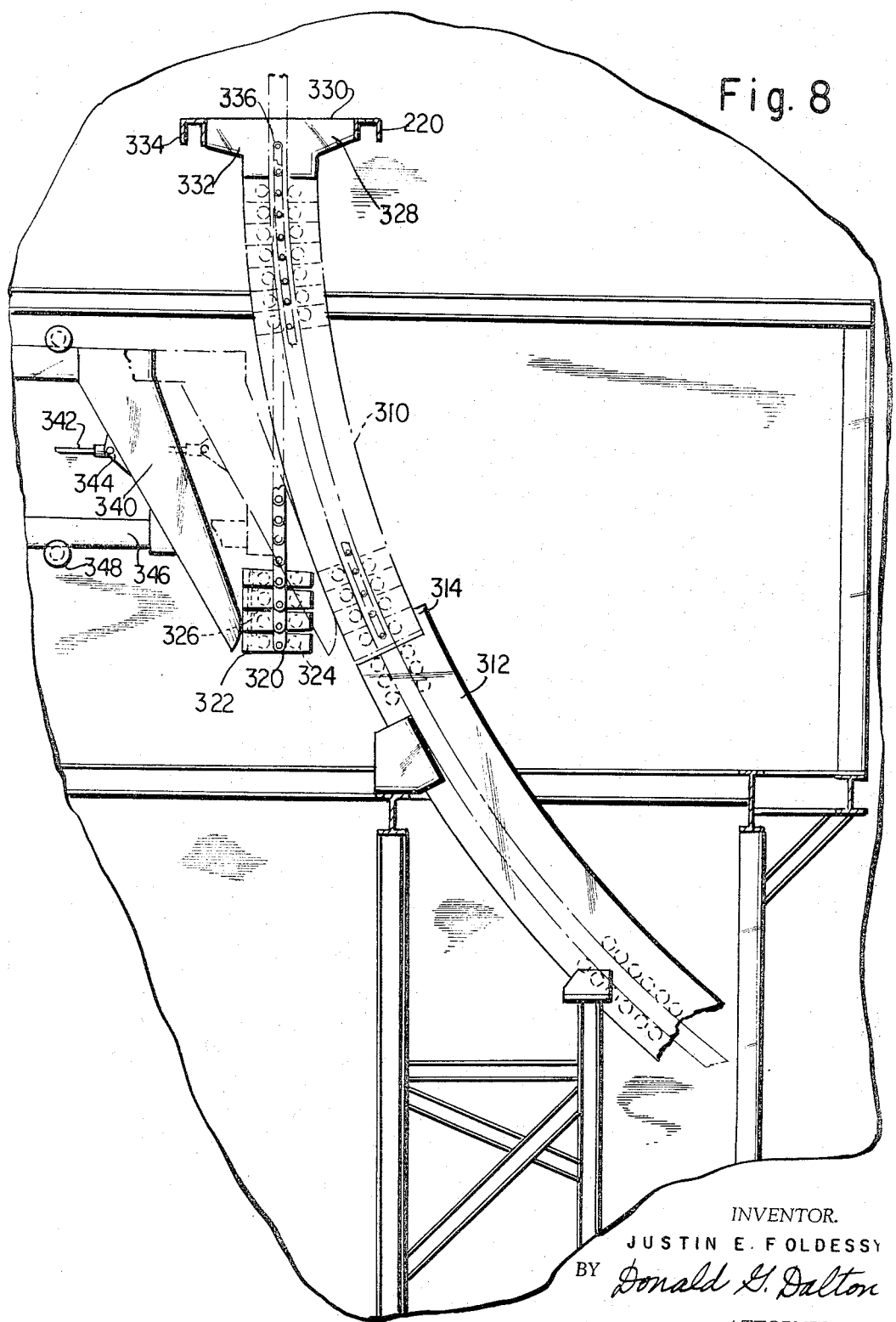

Aug. 29, 1967 J. E. FOLDESSY 3,338,297
APPARATUS FOR BENDING A CASTING HAVING A LIQUID CORE
Filed March 6, 1964 10 Sheets-Sheet 9
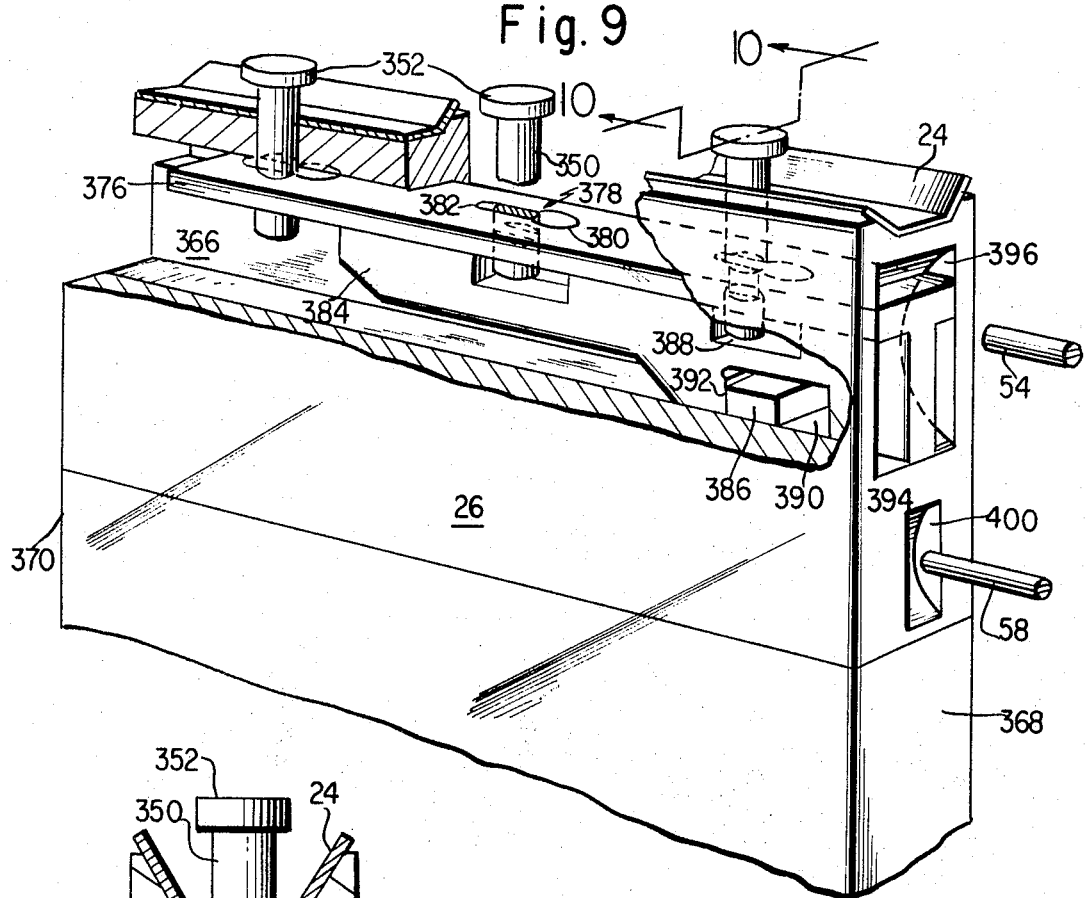
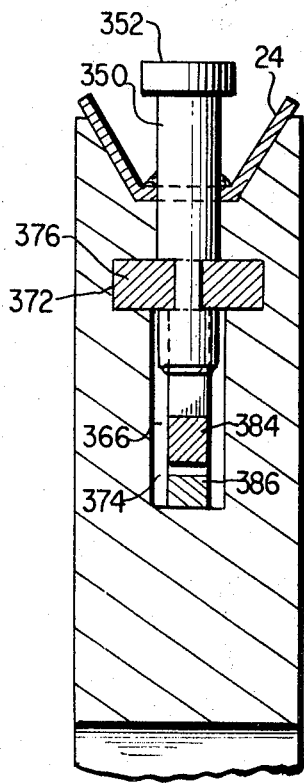
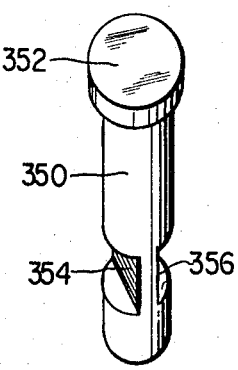
INVENTOR.
JUSTIN E. FOLDESSY
BY Donald G. Dalton
ATTORNEY United States Patent Office 3,338,297
Patented Aug. 29, 1967

3,338,297
APPARATUS FOR BENDING A CASTING HAVING A LIQUID CORE
Justin E. Foldessy, Ogden Dunes, Ind., assignor to United States Steel Corporation, a corporation of Delaware
Filed Mar. 6, 1964, Ser. No. 349,944
15 Claims. (Cl. 164—274)

This invention relates to a method and apparatus for continuous casting, especially to a novel method for bending and guiding a continuously formed casting in a curved path before the core of molten metal is solidified and to apparatus therefor.

It is customary in the continuous casting of metals to provide an apparatus comprising a vertical tubular mold open at the upper end for receiving molten metal and open at the lower end for the discharge of a metal casting, cooling means comprising a plurality of water sprays located below the mold for directing cooling water against the casting as it descends vertically, guide means comprising a plurality of guide rolls, located between the water sprays, for guiding the casting vertically as it moves downwardly through the cooling zone, and motor driven pinch rolls located below the guide rolls for controlling the rate of descent of the casting. The cooling means are mounted on a suitable immovable frame. The guide rolls and pinch rolls are mounted for rotation in suitable mountings, which are also mounted on an immovable frame.

As the casting emerges from the discharge opening of the mold, it has a solidified metal skin around its periphery but has a liquid core of substantial volume. This liquid core is gradually solidified as the casting descends through the cooling zone. By the time the casting reaches the bottom of the cooling zone and passes through the pinch rolls in the usual apparatus, the liquid core is nearly solidified.

It is necessary to close the lower discharge end of the mold initially when molten metal is being poured into the mold. This is usually done by the insertion of a starter bar into the bottom of the mold. The starter bar is an elongated metal bar, usually rigid, which has a cross-sectional shape approximately the same as that of the mold with a slightly smaller cross-sectional area in order to permit ready insertion of the bar upwardly through the guide rolls and into the bottom of the mold. The starter bar, in addition to closing the discharge end of the mold while molten metal is being poured, also supports the metal column or casting as it descends through the guide rolls and pinch rolls.

After the starter bar has passed through the pinch rolls, it is severed from the casting. This is conventionally done by means of one or more cutting torches located a short distance below the pinch rolls. These torches cut the casting a short distance above the top of the starter bar. The starter bar, with a short length of casting attached to the top theerof, is lowered vertically, supported by a suitable platform, basket, or the like. At the bottom of its vertical travel, the starter bar is lowered to a horizontal position and transported horizontally away, by power driven rollers for example. The short length of casting attached to the starter bar must be removed before the starter bar can be used again.

The casting (excluding the short length which remains attached to the starter bar) after its severance from the starter bar is generally handled in either one of two different ways. According to one mode of operation, the casting is cut into lengths by means of the above mentioned cutting torches. Each cut length of casting is then lowered vertically and laid down to the horizontal position and transported away in the same manner as the starter bar. According to a second mode of operation, the casting after severance from the starter bar is deflected from its vertical path by a horizontally reciprocable roll known as a pusher roll, and guided in a curved path as it is bent from its initial vertical direction to a horizontal direction by means of a stationary guide frame having a plurality of guide rolls beneath the casting for supporting it. When the casting reaches a horizontal direction, it is straightened out by conventional means, such as straightening rolls. The casting after straightening may be reheated if necessary and rolled, or otherwise treated in any desired manner.

Both of the two above modes of operation and the apparatus associated therewith contemplate that the casting will be completely or at least nearly solidified by the time it passes through the pinch rolls. It is essential that the casting be completely solidified before it is cut with a cutting torch in order to detach the starter bar; otherwise the liquid metal in the core of the casting would flow out when the casting is cut.

The present methods and apparatus for continuous casting of metals and particularly of iron and steel, have the disadvantage that a tower of considerable height is required in order to provide a vertical cooling zone of adequate height for solidifying the casting completely. To minimize the unwieldly height of the cooling zone, it is desirable to cool the casting partially during its vertical descent, to solidify only part of the molten metal core, and thereafter completing solidification while the casting is being bent from the vertical to a horizontal direction.

A further disadvantage of present continuous casting apparatus is that a short length of casting remains attached to the starter bar after cutting and must be separated before the starter bar can be used again.

In order to bend a casting and to disconnect the same from the starter bar without the necessity of cutting the casting with cutting torches, a novel type of starter bar which can be completely disconnected from the casting without severance or any part of the casting remaining attached to the starter bar is essential. Presently known rigid starter bars cannot be used with this invention because these have to be severed from the casting.

It is an object of this invention to provide a continuous casting apparatus which includes a casting guide frame especially designed for guiding a casting having a core of molten metal in a curved path.

Another object of this invention is to provide novel casting guide frame structures which are especially suited for guiding a casting having a molten metal core in a curved path.

This invention will now be described with reference to the accompanying drawings in which:

FIG. 7 is a side elevation of a third embodiment of this invention;

FIG. 8 is a side elevation of a curved guide frame according to a fourth embodiment of this invention;

FIG. 9 is an isometric view, with parts cut away and parts shown in section, of a starter bar which is useful in the apparatus of this invention;

FIG. 10 is taken along the line 10—10 of FIG. 9;

FIG. 11 is a detail perspective view of a pin for anchoring the casting to the chill plate.

Figure 1:
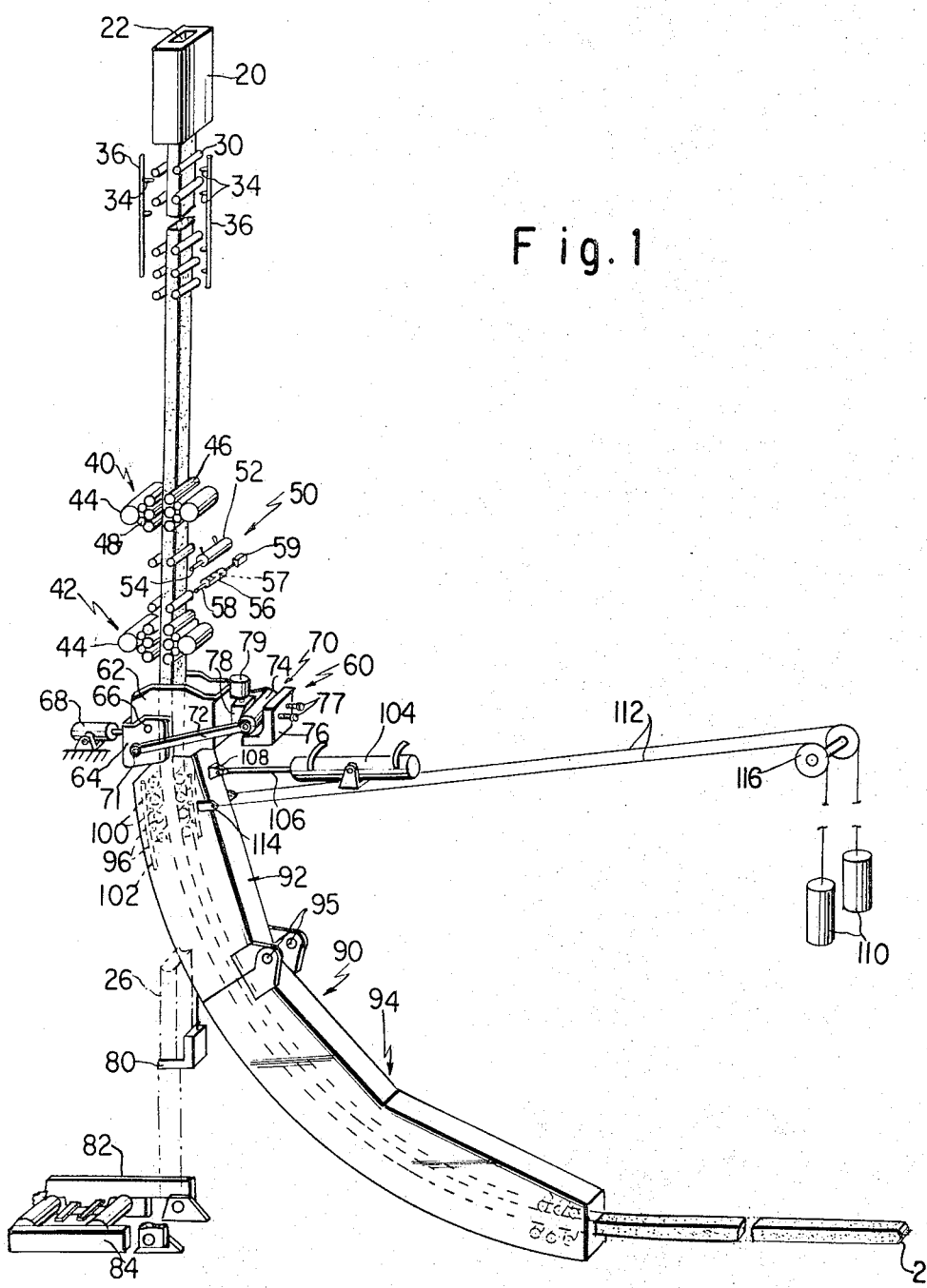
FIG. 1 is an isometric and schematic view of the apparatus of this invention.

Referring now to FIG. 1, 20 is a generally vertically extending tubular mold having a passage 22 extending therethrough. This passage 22 includes an upper opening for the introduction of molten metal to form a casting and a lower discharge opening through which said casting may descend continuously as it is formed. The mold may be of any cross-sectional shape desired, but for purposes of illustration a rectangular mold is shown.

It is necessary to close the lower discharge passage of mold 20 prior to the pouring of molten metal therein. A chill plate 24 which is initially releasably secured to a starter bar 26 as shown in FIG. 9 constitutes a member for initially closing the mold and for forming a surface against which the molten metal of the casting solidifies after it is poured into the mold. An exemplary embodiment of this chill plate and starter bar will be described later with reference to FIGS. 9 to 11 inclusive. The chill plate 24 and the starter bar 26 releasably secured thereto are initially inserted into the lower end of the mold so as to close the lower discharge opening. Molten metal is then poured into the upper opening of passage 22 until the metal reaches a predetermined depth within mold 20. The outer surface of molten metal abutting tubular mold 20, and the lower surface of molten metal abutting chill plate 24, solidify while still in the mold and before descent of the starter bar begins. Means which will be described in detail with reference to FIGS. 9 to 11 provide a firm interlocking grip between chill plate 24 and the solidified lower end of the metal casting. After the depth of molten metal in the mold has reached a predetermined level near the top, the starter bar, chill plate, and casting attached thereto are lowered.

A plurality of guide rolls 30 are located directly below a discharge passage of the mold for guiding the starter bar and the casting in a vertical path as they descend. Such guide rolls are well known in continuous casting apparatus.

Also located below mold 20 is a cooling means comprising a plurality of spray nozzles 34 which are supplied with water through headers 36. The spray nozzles 34 are directed against the opposite faces of the casting, and are positioned to direct their streams of water between successive guide rolls 30. The structure of water spray nozzles and headers for continuous casting apparatus is known in the art, and any of the known structures may be used here.

The spray nozzles 34 and guide rolls 30 together constitute a vertical cooling section in which at least a part of the molten metal in the core of the casting is solidified. An important difference between this vertical cooling section and vertical cooling section of a conventional continuous casting apparatus is that the length of the cooling section in this apparatus will be less than that necessary for complete solidification of the casting under conventional casting conditions.

A pair of pinch roll assemblies 40 and 42 are located at predetermined elevations below guide rolls 30 and spray nozzles 34. Each of the pinch roll assemblies comprises a pair of large driven rolls 44 and a plurality of smaller idler rolls 46 which are arranged to bear against the opposite faces of the casting and to exert a force against the casting so as to control the rate of its descent. In addition to the idler rolls 46, additional rolls 48 may be located between the driven rolls 44 and the rolls 46 which bear against the faces of the casting An actuation system 50 is located between upper pinch roll assembly 40 and the lower pinch roll assembly 42 for releasing starter bar 26 from chill plate 24 when the starter bar reaches the predetermined elevation at which the actuating means 50 is located. Suitable actuating means are fully described in the copending applications of Justin E. Foldessy and Francis Gallucci, Ser. No. 333,383, filed Dec. 26, 1963, and Justin E. Foldessy and Andrew L. Poulos, Ser. No. 333,449, filed Dec. 26, 1963. The operation of this actuating means will be described in further detail with particular reference to FIG. 12.

The bending means, indicated generally at 60, is located below the lower pinch roll stand 42. The purpose of this bending means is to bend the casting and deflect it from its vertically downward path in a laterally extending direction. The amount of deflection imparted by bending means 60 is small but is sufficient to facilitate the guiding of the casting in a curved path as it continues to descend. This bending means 60 includes a stationary roll assembly 62, and a movable roll assembly 64 which is movable through a small arc about a pair of axially aligned non-rotating shafts 66 which are journaled in stationary roll assembly 62 so as to permit unimpeded vertical descent of the starter bar 26 in a first position and to initiate the deflection of the casting from its initial vertical direction to a direction which is generally vertical but with a small horizontal component when in its second position. Bending means 60 also includes a hydraulic cylinder 68 for moving the bending means between the two positions, and a locking means indicated generally at 70, comprising a pair of pivot pins 71, a pair of arms 72 pivotally secured at one end to pivot pins 71 and at the opposite end to a shaft 74, which is held in place between a back-up plate 76 having set screws 77 therein, and vertically reciprocable wedge 78 which can be moved up and down by hydraulic cylinder 79, so as to lock the movable frame member 64 in position.

The starter bar 26 continues its straight downward course after it is released from the chill plate 24 and casting attached thereto by the operation of actuation mechanism 50. As indicated in the last paragraph, bending means 60 is in its first position as the starter bar descends. A vertically traveling receptacle 80 receives starter bar 26 during its vertical descent below the bending mechanism 60 and lowers the starter bar to a predetermined level. When the traveling receptacle 80 reaches the bottom of its travel, the starter bar 26 is received by a tilter frame 82 which lowers it to the horizontal position, and it is then conveyed away on horizontal conveyor 84, for reuse if necessary. The traveling receptacle 80, tilter frame 82, and horizontal conveyor 84 are all known in the art, and further details will not be given here.

The apparatus of this invention includes a novel casting guide means 90 which guides the casting in a curved path from the generally vertical direction in which the casting is traveling as it emerges from bending means 60. The casting guide means 90 is preferably located immediately below bending means 60 so that the casting is continuously supported and guided as it descends from the bending means to the casting guide means. This guide means 90 includes an upper movable section 92 and a lower fixed section 94. The upper movable section 92 is pivotable about pivot pins 95 which are located at the bottom of this section. Each of the sections 92 and 94 of guide means 90 includes a plurality of rolls 96, the axes of which are arranged along two curved lines defining therebetween a curved path for the casting, and a plurality of spray nozzles 100 which are supplied with water through headers 102. As the casting is guided in a curved path in its descent through guide means 90, it is further cooled by water issuing through the spray nozzles 100 and is completely solidified.

The upper movable section 92 is movable between a retracted position shown in dot and dash lines in FIG. 4, in which the starter bar 26 may be brought vertically downwardly without interference from the guide section, and a normal operating position which is shown in solid lines in FIG. 4, in which the upper guide section is adapted to receive and guide the casting as it descends below the bending means 60. The upper guide section 92 in its second position provides a curved path for the casting from bending means 60 to the fixed guide section 94. Movement of the upper section 92 is accomplished by means of hydraulic cylinder 104 having a piston rod 106 which is attached to the movable section 92 by means of an attaching bracket 108. Counterweights 110 facilitate movement of the movable section 92 from normal to retracted position so as to lessen the amount of force which has to be exerted by hydraulic cylinder 104. In addition the counterweights will minimize the shock in positioning table from the retracted to the normal position. The counterweights are attached to cables 112 which are attached at their opposite ends to casting guide frame section 92 by means of attaching brackets 114. Cables 112 pass over pulleys 116.

The casting is traveling in a curved path as it emerges from the lower or discharge end of fixed section 94 of guide means 90. It may then be processed further as desired.

Various embodiments of the curved guide section 90 may be made within the scope of this invention. Four such embodiments will be described in detail with particular reference to FIGS. 4, 5, 6, 7 and 8, respectively.

Figure 2:
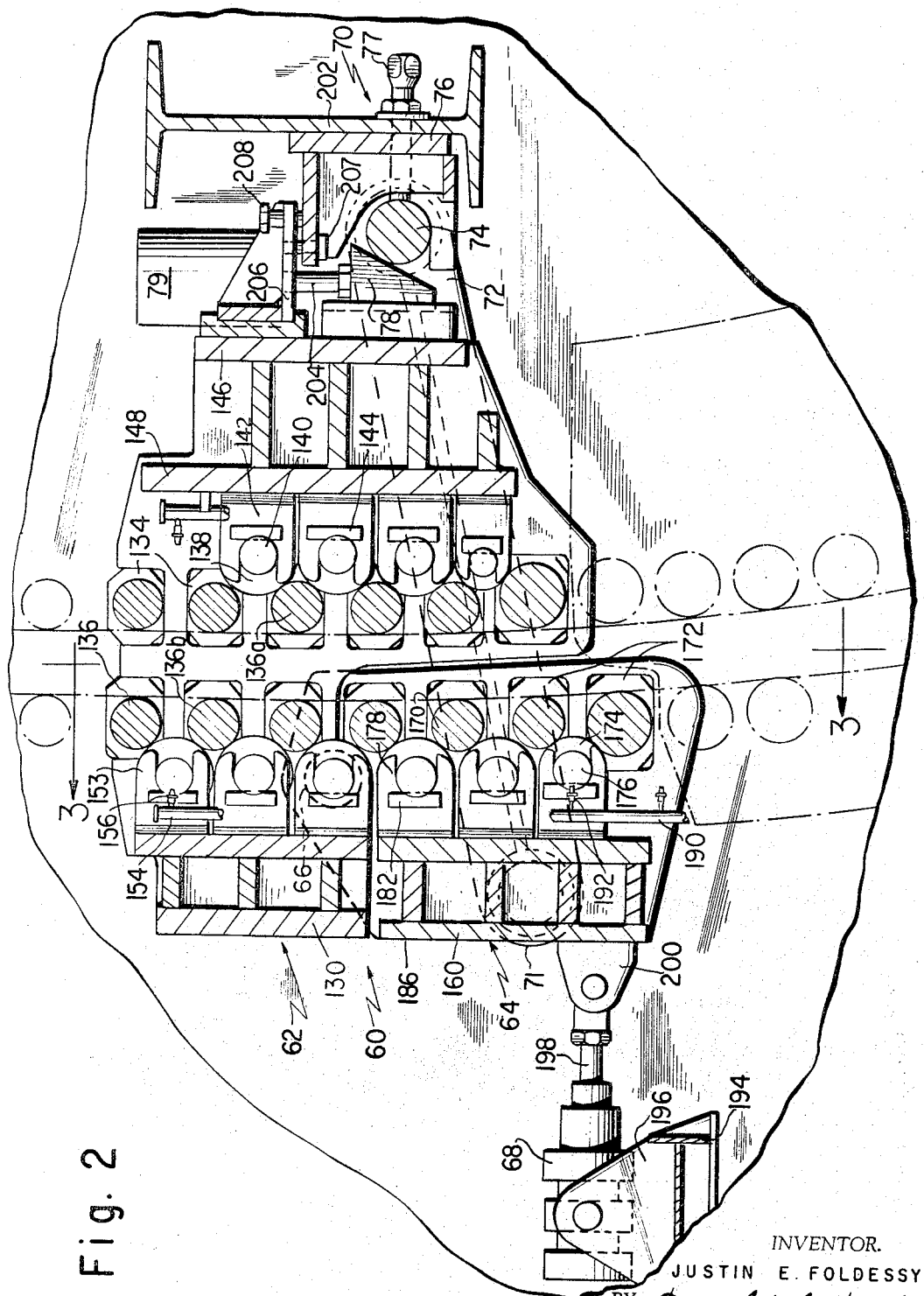
FIG. 2 is a side sectional view of the apparatus for bending the casting.
Figure 3:
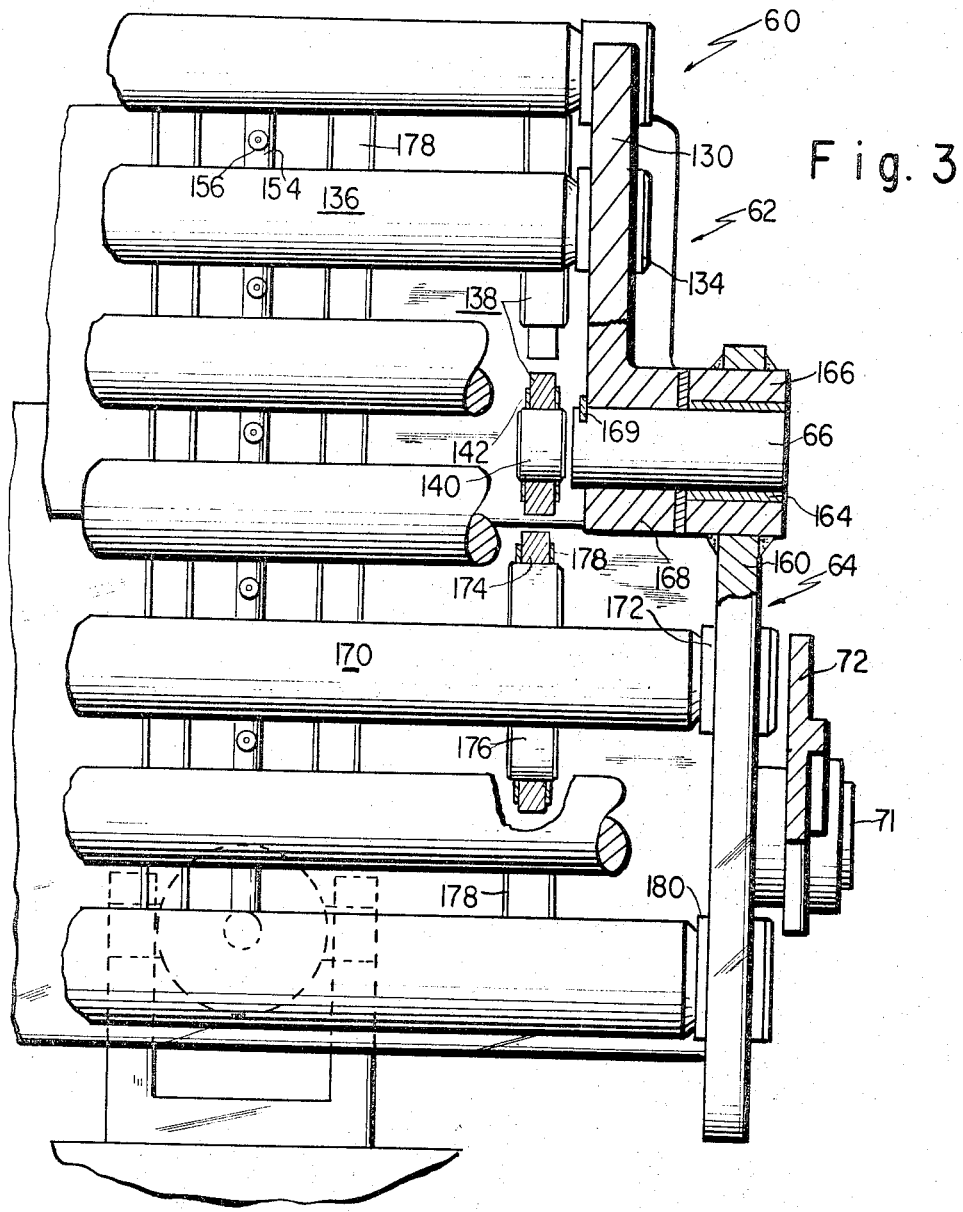
FIG. 3 is a view taken along the line 3—3 of FIG. 2.

Referring now to FIGS. 2 and 3, the stationary roll assembly 62 in bending means 60 includes a box type fixed frame 130 having bearings 134 which receive guide rolls 136 which bear against the two opposed faces of the casting as it descends. Guide rolls 136 are arranged in a pair of rows 136a and 136b which bear against the two opposite faces of the casting. The upper rolls in row 136a are aligned so that the lines along which each of these rolls contact the casting lie in a vertical plane. The rolls in the lower portion of row 136a are aligned so that the lines of contact between these rolls and the casting define a curved surface having a large radius of curvatures with the center to the right as seen in FIG. 4. The opposed row 136b of rolls, which is to the left as seen in FIG. 4, consists of several rolls aligned to form a vertical plane. The guide rolls 136 are supported against outward bending by a plurality of back-up rolls 138, which are journaled on stub shafts 140. Shafts 140 are supported by bifurcated brackets 142 and held in place by keys 144. The fixed box type frame 130 supports guide rolls 136a and 136b as well as back-up rolls 138. The guide roll bearings 134 are mounted directly on the frame 130. The stationary roll assembly 62 is also provided with a pair of water headers 154 having a plurality of spray nozzles 156 projecting therefrom. The water spray nozzles 156 are arranged so as to project their streams of water between adjacent rolls 136.

The structure of the movable rool assembly 64 is generally similar to that of stationary roll assembly 62. Movable roll assembly 64 includes a movable frame 160 and the assembly 64 is pivoted about a pair of axially aligned non-rotating shafts 66. Shafts 66 are placed in bushing 164, which in turn is placed in bearings 166, integrally connected to frame 160. These shafts 66 also extend through sleeves 168 in the fixed frame 130 and locked in position by keys 169.

Movable roll assembly 64 has a plurality of guide rolls 170 which are journaled in bearings 172 secured in side walls of frame 160. The lines of contact between rolls 170 and the casting form a curved surface having a large radius of curvature. When movable roll assembly 64 is in its first position, these rolls are in such a position that they do not interfere with the vertical downward travel of starter bar 26. When movable roll assembly 64 is in its second position, these rolls initiate the bending of the casting from its vertical downward path to a curved path. A plurality of back-up rolls 174 journaled on stub shafts 176 support the guide rolls 170 at spaced intervals to prevent bending. Shafts 176 are supported by bifurcated brackets 178 and held in place by keys 182. Movable roll assembly 64 has a water header 190 having a plurality of spray nozzles 192 projecting therefrom to direct cooling water against the casting. These spray nozzles are arranged to project their streams of water between adjacent rolls 170.

Movable roll assembly 64 is rotated through a small arc about the axles 66 by means of hydraulic cylinder 68. The hydraulic cylinder is mounted on a fixed platform 194 by means of pivot ears 196. Hydraulic cylinder 68 has a piston (not shown) and a piston rod 198 which projects externally therefrom and is fixedly attached to frame 186 of movable roll assembly 64 by means of pivot ears 200. When movable roll assembly 64 has been moved to the selected position, it is secured in place by means of locking structure 70. The back-up plate 76 is bolted to beam 202, which is part of the stationary supporting structure. Screws 77 limit the position of shaft 74. The travel of wedge 78 is controlled by the position of the piston in cylinder 79. This cylinder has a piston rod 204 which limits the movement of wedge 78. Cylinder 79 is fixedly mounted on bracket 206. Adjusting screws 207 and 208 are provided for initially aligning fixed roll assembly 62. The movable roll assembly may be locked in either retracted position for permitting vertical descent of a starter bar or casting, or normal position for initiating the deflection of the casting into a curved path as it descends by appropriate movement of wedge 78 and shaft 74.

Figure 4:
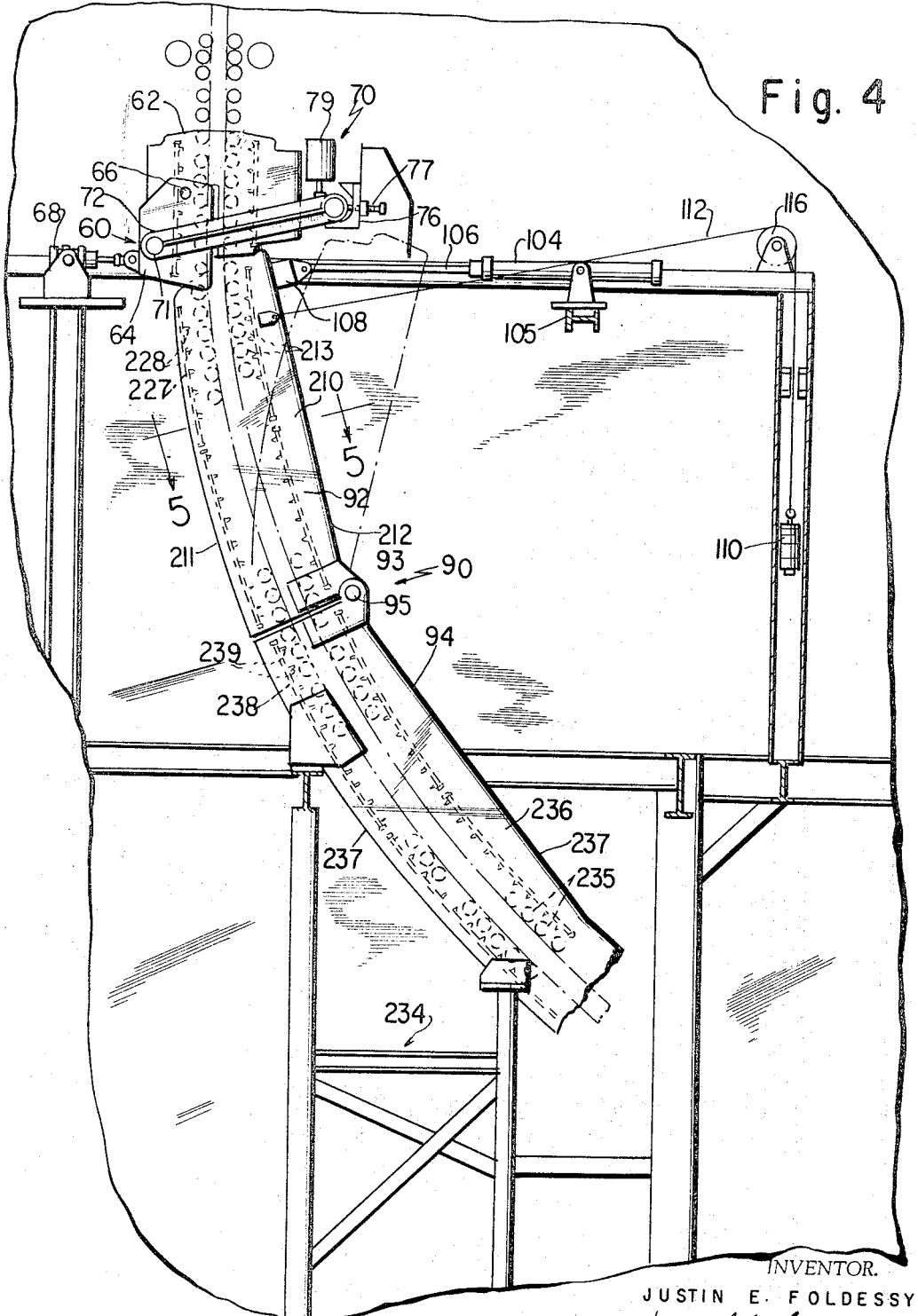
FIG. 4 is a side elevation showing a curved guide frame according to one embodiment of the invention.
Figure 5:
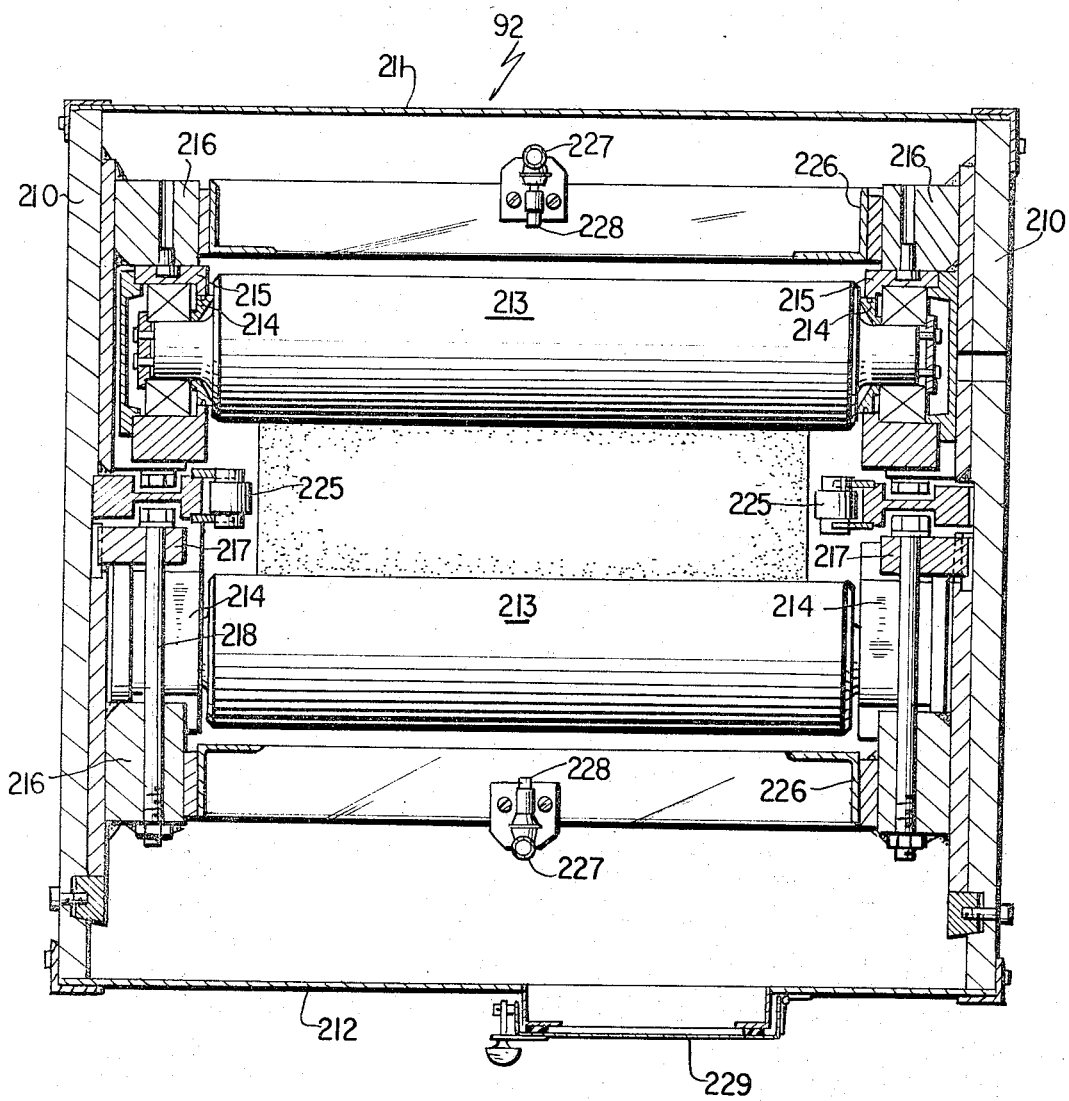
FIG. 5 is a cross section taken along the line 5—5 of FIG. 4.

Referring now to FIGS. 4 and 5, a casting guide means 90 includes a movable upper guide frame 92 and a lower fixed guide frame member 94 as already explained. The movable guide frame member 92 is a four-sided enclosed structure having a pair of side walls 210 and a pair of end walls 211 and 212. The lower end wall 211, which lies beneath the curved path of the casting, is a relatively thin curved wall of steel plate, and parallel to the curved path of the casting. Upper end wall 212, which lies above the curved path of the casting, is also a relatively thin steel plate wall. The guide section 92 has a plurality of guide rolls 213 which guide the casting in a curved path. The axes of guide rolls 213 lie along a pair of curved lines which define the curved path of the casting therebetween. Guide rolls 213 are journaled in bearings 214, which are eccentrically mounted in chocks 215. Chocks 215 are held in housings 216. Centering rolls 225 can be provided if desired. Separator beams 226 are secured to housings 216 for alignment of the guide frame 92. A pair of water headers 227 are fixedly mounted on beams 226. These water headers supply a plurality of spray nozzles 228, which are arranged to direct streams of cooling water against the casting and between successive guide rolls 213. An inspection door 229 in side wall 212 may be provided.

Pivotal movement of frame 92 about pivot pin 95 is provided by hydraulic cylinder 104, which has a piston rod 106 attached to a mounting bracket 108 which is in turn attached to frame 92. Cylinder 104 is mounted on a suitable fixed structural framework member such as I-beam 105.

Movable frame member 92 is movable between a retracted position, shown in the dotted lines of FIG. 4, which permits unimpeded vertical descent of starter bar 26, and a normal operating position, shown in the solid lines of FIG. 4, wherein the upper end of this frame member 92 is positioned directly below the lower end of bending means 60 so as to provide a continuous curved path for the casting as it descends. Bending of the casting is initiated by the bending means 60. When the catsing emerges from the bending means 60 and enters guide frame member 92 it conforms to the curved path of guide rolls 213.

Fixed guide frame member 94 is supported by a fixed structural framework 234. This fixed guide frame member 94 is virtually identical to the movable guide frame member 92, and hence a cross-sectional view and a detailed description of this frame member are omitted. Fixed frame member 94 is an enclosed four-sided structure having a plurality of guide rolls 235, a first pair of sides 236 perpendicular to the axes of the guide rolls, and a second pair of sides 237 intersecting sides 236 and lying generally parallel to the guide rolls. The axes of guide rolls 235 as shown in FIG. 4 lie along a pair of curved lines which define therebetween a path for the casting as it descends. The lines of contact between the guide rolls 235 and the descending casting form a pair of generally curved surfaces which define a curved path for the casting. The casting as it emerges from the bottom of guide frame 94 is traveling in an oblique direction having a substantial horizontal component. Guide frame 94 is also provided with a pair of water headers 238 having a plurality of spray nozzles 239 for directing cooling water against the casting to complete solidification before it emerges from the lower end of fixed guide frame 94. The streams of water emerging from nozzles 239 are directed between successive guide rolls 235.

Figure 6:
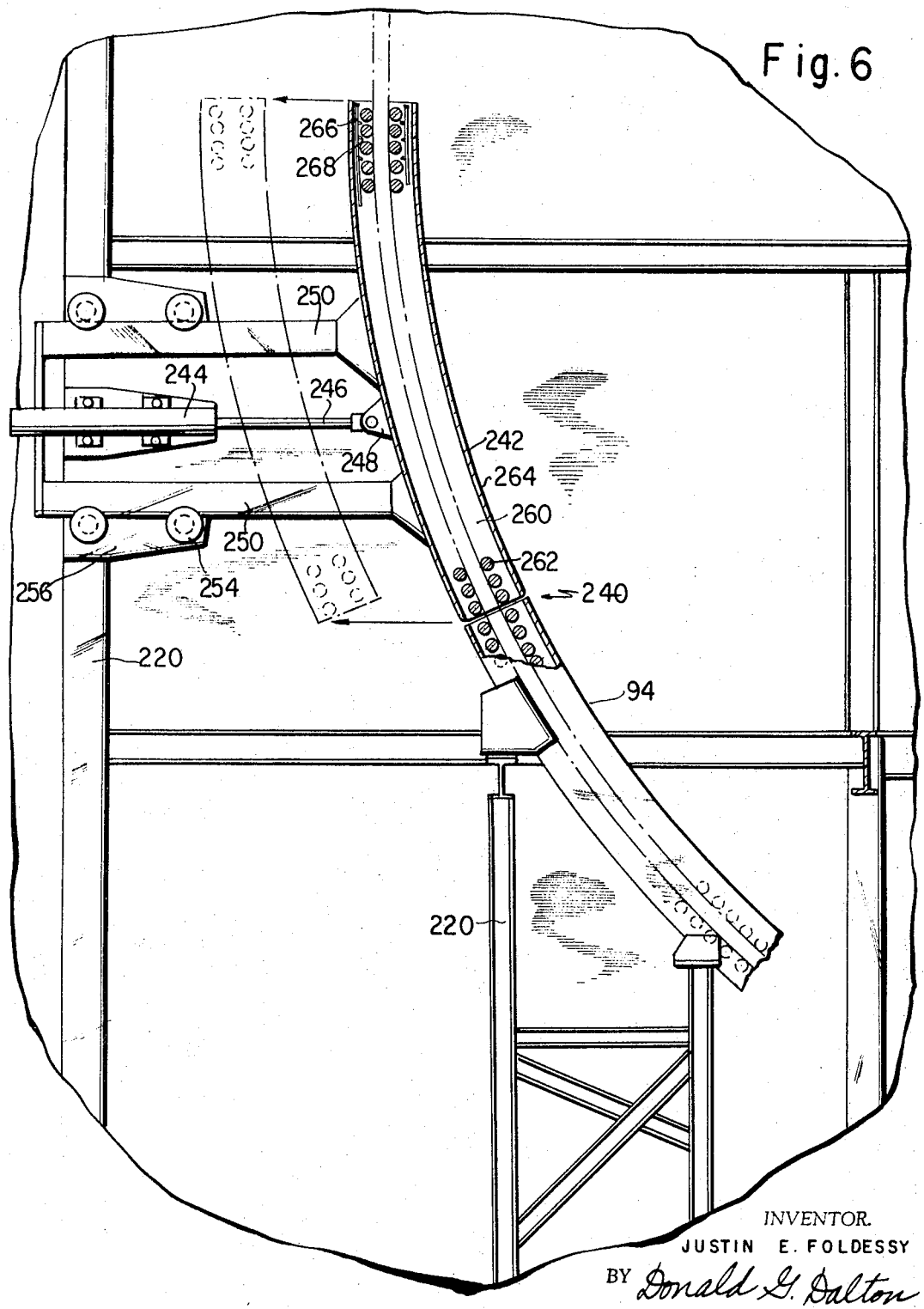
FIG. 6 is a side elevation of a curved guide frame according to a second embodiment of this invention.

Referring now to FIG. 6, there is shown a second embodiment of the guide frame according to this invention. This embodiment, designated generally as 240, includes a movable guide frame member 242 and a fixed guide frame member 94. The fixed guide frame member 94 in this embodiment is similar to that shown in the embodiment of FIG. 4.

Movable guide frame member 242 is reciprocable between a retracted position, shown in dotted lines, and a normal position, shown in solid lines in FIG. 6. Reciprocating movement is provided by a hydraulic cylinder 244 having a piston rod 246 extended therefrom and connected to a mounting bracket 248, secured to the side walls of frame member 242. A pair of tracks 250 secured to framework 242 ride on flanged wheels 254 which are journaled in mounting brackets 256 which are secured to the fixed structural framework 220.

The structure of guide frame 242 is generally similar to that of guide frame 92 illustrated in FIG. 4, the only essential difference being the manner of movement. Guide frame 242 is an enclosed four-sided structure having a pair of side walls 260 in which a plurality of guide rolls 262 are journaled. Guide rolls 262 are arranged in a pair of curved rows, their axes lying along a pair of curved lines defining a path for the casting therebetween. The lines of intersection between the guide rolls 262 and the path of the casting as it descends define a pair of curved surfaces. The other two side walls 264 intersect side walls 260 and are generally parallel to guide rolls 262. A pair of water headers 266 having a plurality of spray nozzles 268 are provided for directing cooling water against the casting.

When the movable guide frame member 242 is in the retracted position shown in dotted lines, the starter bar 26 is free to descend vertically without interfering with this guide frame member. When the guide frame member is moved to the normal position, shown in solid lines in FIG. 6, it receives the casting as it emerges from bending means 60 while it is traveling substantially vertically, and guides the casting in a curved path. The movable frame member 242 in its normal position, and the fixed frame member 94 cooperate to provide a single continuous curved path for the casting.

Guide frame 270 according to the third embodiment of the invention, shown in FIG. 7, comprises a movable rigid frame 272 and a fixed rigid frame 274. The frame 270 of this embodiment is similar to frame 240 as shown in FIG. 6, except that a portion of the frame structure which is included in movable frame member 242 in FIG. 6 is a part of fixed frame 274 in this embodiment. The movable rigid frame 272 is an open three-sided structure having a pair of opposed side walls 276, a curved back wall 278 which is generally parallel to the path of the casting, and a plurality of guide rolls 280. The axes of guide rolls 280 are arranged along a single curved line, and these guide rolls are adapted to bear against a single face of the casting during its decent. Frame 272 is provided with a water header 282 and a plurality of spray nozzles 284 projecting therefrom. These spray nozzles direct water between adjacent guide rolls 280 and against one face of the casting. Guide frame 272 is reciprocable between the retracted position, shown in dotted lines, which permit unimpeded vertical descent of the starter bar, and the normal position, shown in solid lines, in which guide frame 272 cooperates with guide frame 274 to provide a curved path for the casting as it descends. The structure for accomplishing reciprocatory movement of guide frame 272 is similar to that for moving guide frame 242 in FIG. 6 and consists of a hydraulic cylinder 244 having piston rod 246 attached to mounting bracket 248 of frame 272. A pair of tracks 250 secured to frame 272 ride on flanged wheels 254 which are mounted on brackets 256 for guiding the movement of curved guide frame 272.

Guide frame 274 consists of an upper portion 285 and a lower portion 286. Frame portion 286 is a four-sided structure having a pair of opposed side walls 288 and a pair of curved side walls 290 and 292 which are generally parallel to the path of the casting, and axes of guide rolls 280. Side 290 extends the entire height of fixed upper portion 285. Side 292 extends only below the lower portion 286 of frame member 274 and its upper end terminates at the lower end of movable frame member 272. Only the lower portion 286 is an enclosed four-sided structure. The upper portion 285 is a three-sided structure which is complementary in shape with movable frame member 272. Frame member 274 has guide rolls 293 arranged in two curved rows 293a and 293b for guiding the opposite faces of the casting. Row 293a lies entirely in the lower portion of the frame and is a continuation of row 280 in movable frame member 272 when that frame member is in operating position. Row 293b extends the entire length of frame 274. Frame 274 has a water header 300 which lies parallel and close to side wall 290, and a second water header 302 which lies parallel and close to side wall 292. Each of these headers has a plurality of nozzles 304 projecting laterally therefrom and adapted to spray cooling water against the casting.

Referring now to FIG. 8, there is illustrated a fourth embodiment of the present invention. In this embodiment there is a movable guide frame section 310 and a fixed guide frame section 312 therebelow. Fixed guide frame section 312 is structurally similar to guide frame section 94 in the embodiments of FIGS. 4 and 5 except for the presence of an outwardly extending guide flange 314 near the top thereof for guiding the movable section 310 as will be hereinafter explained.

Movable guide section 310 comprises a chain 320 arranged at each side having a plurality of links therein. Pivotally attached to each link is a guide section 322 having one pair of rolls 324 journaled in said guide section and adapted to bear against the opposite faces of the casting. Each of the guide sections 322 also includes water spray nozzles 326 adjacent one end thereof, arranged to direct streams of water against the casting without striking guide rolls 324. In other words, each of these streams of cooling water is directed between the guide roll 324 in the guide section supporting said nozzle and the corresponding guide roll in the adjacent guide section. Each of the guide sections 322 extends transversely of chain 320 on either side thereof.

The top of guide section 310 has a supporting structure 328 for supporting chain 320. This supporting structure 328 is a suitably designed structure having a top surface 330 and a pair of side walls 332 extending downwardly therethrough. This structure 328 is fixedly secured to a fixed rigid supporting structure denoted herein by a pair of channel sections 334. A pin 336 or number of pins extending through each side wall 332 supports chain 320. When no lateral force is applied to frame member 310, it hangs freely in a vertical position, and in this position permits unimpeded descent of the starter bar. The frame member 310 can be moved by a suitable supporting member or pusher 340 to normal position, in which the frame assumes a curved shape and in which the lower end of frame 310 is in alignment with fixed frame 312 and is held in proper alignment by guide flange 314. The surface contour of pusher member 340 is made to suit the desired curve of frame 310 in its normal operating position. The actuating means for pusher 340 is similar to the actuating means for the embodiments shown in FIGS. 6 and 7, and consists of a hydraulic cylinder (not shown), a piston rod 342 attached to the bracket 344 which is fixed to pusher 340, and a pair of tracks 346 which are an integral part of pusher 340 and each co-act with flanged guide wheels 348, which are mounted for rotation in fixed structures.

Because the casting in normal operation according to this invention has a liquid core after it passes through the lower pinch roll stand 42, it is not possible to sever this casting with the usual cutting torch as it descends vertically below the pinch rolls. According to the conventional practice, the casting is severed a short distance above the top of the starter bar, and then the starter bar with this short length of casting is lowered vertically. The remainder of the casting may be cut into lengths and lowered vertically or may be deflected into a curved path according to means presently known in the art. Operation according to this invention requires separation of the casting from the starter bar without cutting the casting, so that the starter bar may descend vertically while the casting is bent by bending means 60 and deflected and guided in a curved path by the guide frame 90 of this invention.

The starter bars used in the present invention may comprise an elongated metal body having a metallic chill plate releasably secured to the top thereof. One such starter bar is illustrated in FIGS. 9 to 11. This starter bar is described in greater detail and claimed in the copending application of Justin E. Foldessy and Francis Gallucci, Ser. No. 333,383, filed Dec. 26, 1963, now Patent 3,266,104, and entitled "Continuous Casting Apparatus Having a Quickly Disconnectable Starter Bar."

Referring now to FIGS. 9 to 11, starter bar 26, which is adapted to be inserted into the lower end of tubular open-ended continuous casting mold 20 as indicated in FIG. 1, is an elongated metal body having a metallic chill plate 24 releasably secured to the upper end thereof.

This metallic chill plate is approximately ¼" to ½" thick. It protects the starter bar 26 from direct contact with molten metal poured into the mold. Chill plate 24 has a plurality of cylindrical pins 350 welded thereto. Pins 350 have heads 352 above the chill plate for gripping the casting in an interlocking grip, and also have necked portions 354 below the chill plate. The starter bar 26 has a T-shaped transverse passage 366 extending therethrough from one edge wall 368 to the opposite edge wall 370 and holes in the upper end to receive pins 350. A rectangular slide plate 376 is slidable in channel 366. Slide plate 376 has a plurality of slots 378 which engage necked portions 354 of pins 350 so as to secure chill plate 24 to bar 26 when the slide plate 376 is in the position shown and to release bar 26 from chill plate 24 and the attached casting when the slide plate 376 is moved to the left. The slots 378 have circular portions 380 which are slightly larger in diameter than pins 350, and oblong portions 382 are narrower than the diameter of pins 350 but slightly wider than the necked portions 354. A flange 384 attached to slide plate 376, and a limit stop 386, limit the extent of sliding movement of slide plate 376. Piston rod 54 strikes slide plate 376 when this slide plate reaches the elevation at which this piston rod is located. This causes sliding movement of slide plate 376 to the left to release the starter bar 26 from chill plate 24. The starter bar may then be lowered at a speed greater than that at which chill plate 24 and the attached casting descends. Starter bar 26 also may have an indentation 400 in at least one edge for receiving piston rod 58 and thereby setting actuating means 50 into operation.

An alternative starter bar which is useful in this invention is that described and claimed in the copending application of Justin E. Foldessy and Andrew L. Poulos, Serial No. 333,449, filed Dec. 26, 1963, now Patent 3,274,653, and entitled "Quickly Disconnectable Starter Bar."

Disconnection of starter bar 26 from plate 24 in the attached casting is accomplished by a striker arm 54 striking slide plate 376 in starter bar 26 when the slide plate reaches the predetermined elevation at which striker arm 54 and cylinder 52 are located. This cylinder is fixedly mounted between the upper and lower pinch roll stands 40 and 42 as has been indicated. Striker arm 54 is normally retracted away from starter bar 26 as shown in FIG. 1. To release starter bar 26 from chill plate 24, piston 53 and striker arm 54 are moved toward the path of the starter bar and casting. When the striker arm 54 reaches the limit of its travel in this direction, it strikes slide plate 376 moving it to the left and releasing starter bar 26 from chill plate 24. Striker arm 54 is then retracted. Striker arm 54 can be operated in any desired manner. In a preferred embodiment, which will now be described, arm 54 is operated automatically when starter bar 26 reaches a predetermined elevation.

Figure 12:
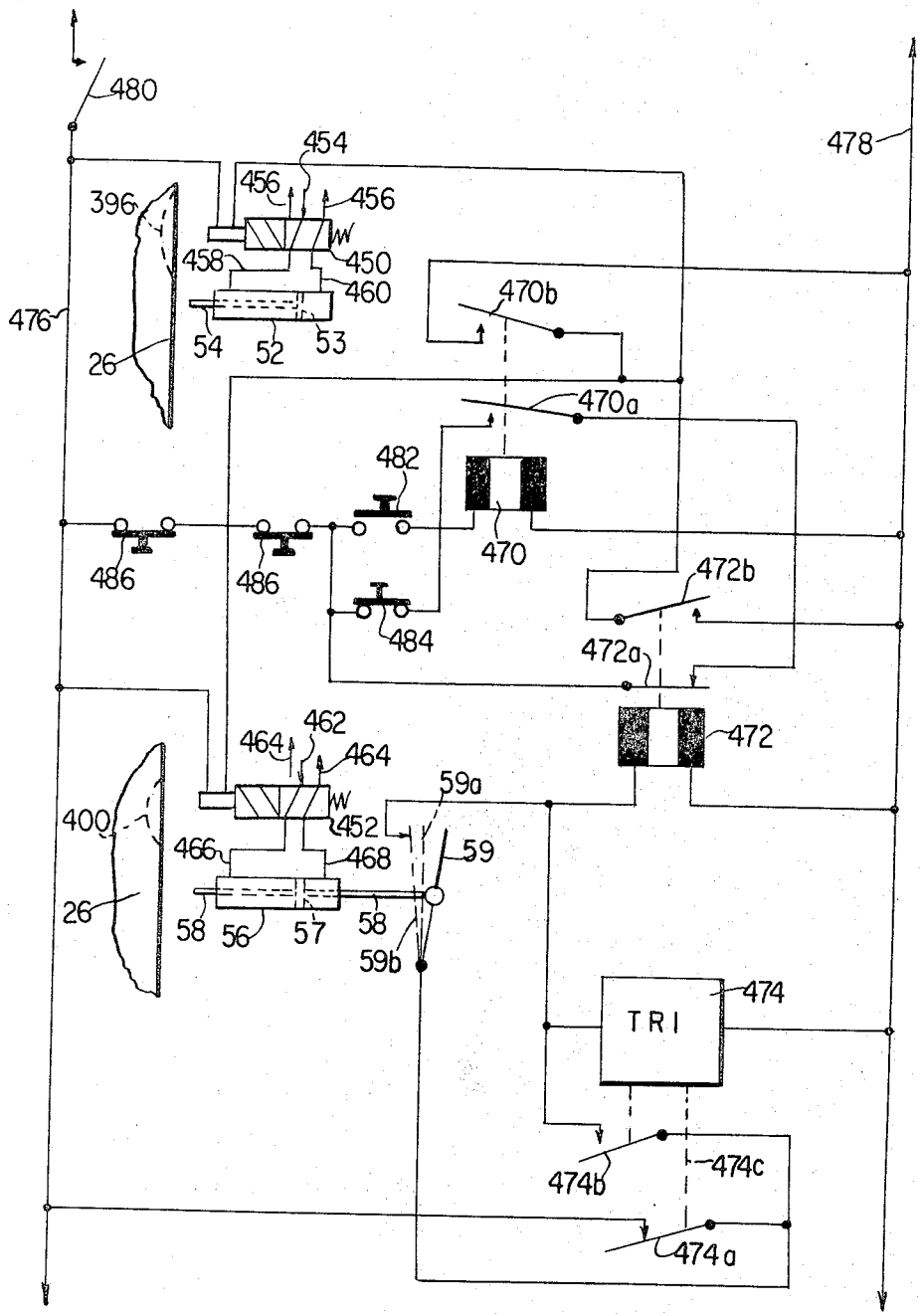
FIG. 12 is an electrical circuit diagram of an actuation system for automatically disconnecting the starter bar from the chill plate and casting when the starter bar reaches a predetermined elevation.

FIG. 12 schematically illustrates a preferred electromechanical automatic actuation system 50 whose function is to release starter bar 26 from plate 24. All components are shown in the de-energized position.

Air cylinders 52 and 56 are controlled by solenoid operated air valves 450 and 452 respectively. Solenoid valve 450 has a connection 454 for the supply of air under pressure, a pair of exhaust connections 456, and connections 458 and 460 leading to either end of cylinder 52. Solenoid operated valve 452 is of identical construction having an air supply passage 462, a pair of air exhaust passages 464, and a pair of connections 466 and 468 leading to the respective ends of cylinder 56.

Operation of solenoid operated valves 450 and 452 is controlled by the state of the contacts associated with control relays 470 and 472 and timing relay 474. Current for the electrical system is supplied from a power source (not shown) through electrical lines 476 and 478. Switch 480 is located in line 476. When this switch 480 is closed, the actuation system 50 is supplied with power and is in condition to be operated.

Operation of system 50 is initiated by pushing one of the two parallel push buttons 482 and 484, both of which are normally open, to closed position. When one of the push buttons is closed, relay 470 is energized, thereby closing the normally open contacts 470a and 470b. The closing of contact 470b energizes the solenoid controlled air valve 452 so as to supply air pressure from supply line 462 to cylinder 56 through line 468 so as to extend the sensing arm 58 forward sufficiently to contact and ride on the edge of the starter bar 26. It should be noted that when the sensing arm 58 is thus extended forward, the limit switch 59 is moved to the dotted line position 59a, in which position it is still open. Closing of switch 59 requires a further forward extension of the sensing arm 58.

Contact 470a closes to provide a holding action so that when the push button 482 or 484 is released, the relay 470 will remain energized by current flowing between the lines 476 and 478 through the normally closed contact 472a, the now closed holding contact 470a, and the relay coil 470. The two buttons 486 which are in this path of current flow are kept normally closed and are simply included for safety purposes to permit manually stopping the operation of this actuation system 50 at two different locations. Accordingly, the manual release of buttons 482 and 484 will, because of the action of this holding contact 470a, leave the sensing arm 58 projected in a forward direction to ride on the starter bar 26.

As the starter bar 26 descends, the sensing arm 58 will ride into the indentation 400, thereby causing the sensing arm 58 to project further forward (to the left in FIG. 13) so as to close the limit switch 59 (shown by the dotted line position 59b). As a consequence, relay 472 is energized through the now closed limit switch 59 and the normally closed contact 474a, which is controlled by timing relay 474 as will be hereinafter explained.

When relay 472 is energized, normally open contact 472b is moved to the closed position, which in turn energizes solenoid operated air valve 450. This causes air under pressure from supply line 454 to be introduced into air cylinder 52 via connection 460, which moves the piston 53 in cylinder 52 and forces the striker arm 54 forward (to the left in FIG. 16) with sufficient force so that the arm 54 will strike the slide plate 376, causing the slide plate 376 to move it to the left as seen in FIG. 9 sufficiently to disengage the starter bar 26 from chill plate 24 and the lower end of the casting. The sensing arm 58 and striker arm 54 are spaced from one another the same distance apart as are the indentation 400 and the slide plate 376, so that the entrance of the sensing arm 58 into the indentation 400 results in the actuation of the striker arm 54 at just the appropriate time to cause the arm 54 to hit the slide plate 376.

The closing of the limit switch 59 also energizes the timing relay 474, the coil of which is arranged in parallel with the coil of the relay 472. Energizing of the timing relay 474 closes the normally open contact 474b, which contact 474b then operates as a holding contact for both the relay 472 and the timing relay 474 so that when the sensing arm 58 rides out of the indentation 400, due to the downward motion of the starter bar 26, the limit switch 59 may open without de-energizing the relay 472 and timing relay 474. The contact 474a is a normally closed contact which is associated with the timing relay 474 but whose state is not affected by the state of the timing relay 474.

When the timing relay 474 has been energized, it starts on a predetermined timing cycle, at the end of which the timing relay 474 mechanically opens the contacts 474a through mechanical linkage 474c, thereby de-energizing the relay 472 and the timing relay 474.

While the timing relay 474 is running through its preset time cycle, it as well as relay 472 remains energized. Normally open contacts 472b are closed by the energizing of the relay 472 and remain closed during the timing cycle. Therefore solenoid operated air valve 450 remains energized and striker arm 54 remains in its forward position (to the left in FIG. 12) while timing relay 474 is running through its preset timing cycle. The duration of this timing cycle is normally not over about two seconds.

Once the timing relay 474 has run its cycle, it mechanically opens contact 474a so as to de-energize both timing relay 474 and control relay 472. De-energizing of relay 472 causes contact 472b to revert to its normally open position and thus de-energize the solenoid actuated air valve 450. De-energizing of the solenoid actuated air valve 450 causes the air cylinder 52 to switch and retract the striker arm 54 to its normally retracted position free of the starter bar 26 and the casting.

Energizing of relay 472 as a consequence of the sensing arm 58 entering the indentation 400 also acts to open the normally closed contacts 472a, thereby de-energizing the relay 470. This de-energizing of the relay 470 opens normally open contacts 470b thereby de-energizing the solenoid actuated air valve 452 and causing the air cylinder 56 to switch and consequently retract the sensing arm 58. Thus the sensing arm 58 is retracted and moved out of the way of the starter bar 26 and the casting immediately after it has entered the indentation 400 and this retraction of the sensing arm 58 is achieved automatically.

After the timing relay 474 has gone through its timing cycle and caused the normally closed contact 474a to open, the timing relay 474 is de-energized and resets itself resulting in the normally open contact 474b opening and the normally closed contact 474a reclosing. In this fashion actuation system 50 returns to its initial state, that being the state illustrated in FIG. 12. It should be noted that in this initial state all of the relays 470, 472 and 474 are de-energized so that the contacts shown are in their normal position. It should also be noted that in this initial state the solenoid actuated air valves 450 and 452 are de-energized and place air pressure in the cylinders 52 and 56 in such a fashion as to cause the sensing arm 58 and striker arm 54 to be in their retracted positions (to the right in FIG. 12).

It should be understood that FIG. 12 is a somewhat simplified schematic drawing of automatic actuation system 50. Additional safety buttons, fuses, meters and the like may be employed to provide information and monitoring of the operation of this automatic actuation system.

Other automatic actuation systems besides the one illustrated can be used. If desired, the sensing mechanism including cylinder 56 and sensing arm 58 can be omitted and the admission of fluid under pressure to cylinder 52 can be under the control of an operator.

Operation according to this invention will now be described with particular reference to FIG. 1. Prior to the start of a casting, the upper end of starter bar and chill plate attached are inserted into the lower end of an open-ended tubular continuous casting mold 20. Molten metal is then poured into the mold until it reaches a predetermined elevation near the top thereof. When this predetermined elevation is reached, the starter bar and the casting attached thereto are slowly brought downward at a uniform rate under the control of pinch roll assemblies 40 and 42. The outer surface of the casting, and the lower end of the casting which abuts the chill plate, solidify while the casting is still in the mold and before movement of the starter bar downwardly is commenced.

After the height of metal in the mold has reached a predetermined level, the starter bar and the casting are brought slowly downward until the starter bar reaches the predetermined elevation at which it is disconnected from the casting by actuation system 50. The upper pinch rolls 40 may be accelerated to rotate at a slightly greater speed than the lower pinch rolls 42 at this time, so as to maintain a slight compression on the casting and the starter bar. A slight compression on the starter bar facilitates disconnection of the starter bar from the chill plate and casting.

The starter bar, being of substantial length and inflexible, must be brought straight downwardly by suitable means such as traveling receptacle 80. The starter bar is then brought rapidly downward, while the casting and the chill plate continue to descend at the slow rate still under the control of pinch rolls 40 and 42. From the time the starter bar is inserted into the bottom of the mold prior to pouring, until the starter bar has been disconnected and lowered below the path of the retractable section 92, the retractable section is in the retracted position as shown in FIG. 4. This permits unimpeded vertical descent of the starter bar.

After the starter bar has been taken out of the way, the casting continues to descend through the lower pinch roll stand 42 and bending means 60. In contrast to presently known continuous casting operations in which the casting is completely solidified before it is bent, the casting in the present invention has a core of molten metal, as it enters bending means 60 in the normal mode of operation. The casting is deflected slightly from its vertical line of travel while in bending means 60. Before the casting emerges from the lower end of bending means 60, the retractable section 92 is retracted from its dotted line position to its normal operating or solid line position as shown in FIG. 1 so as to receive the casting as it emerges from the lower end of bending means 60.

The casting continues to descend successively through the upper and lower sections 92 and 94 of curved guide frame 90, being guided by the guide rolls therein as it descends. The casting still has a liquid core as it enters guide frame 90 and it is cooled by water sprays 100 so as to solidify this liquid core before the casting emerges from the lower end of the fixed section 94 of guide frame 90. The casting may be further processed as desired.

An important advantage of the present invention is that it is possible to cast metal continuously in an apparatus having less height than the usual continuous casting apparatus. Presently it is considerd necessary to solidify the casting completely while it is still traveling in the vertical cooling section directly below the mold and before reaching the pinch rolls. Now it is found that such procedure is not necessary. Instead, partial solidification in the cooling zone directly below the mold is sufficient, and solidification can be completed in a second cooling zone in which the casting is guided in a curved rather than a vertical path. This makes it possible to operate with a vertical cooling zone of considerably less height than was heretofore thought possible.

While this invention has been described with reference to specific embodiments thereof, it is understood that the scope shall be measured only by the scope of the appended claims.

What is claimed is:

1. Continuous metal casting apparatus comprising a generally vertically extending mold having an upper opening for the introduction of molten metal to form a casting and a lower discharge passage through which said casting may descend continuously as it is formed, a chill plate for initially closing the mold discharge passage and for providing a surface on which the molten metal initially solidifies to form the end of a casting with said plate attached thereto, a vertically movable starter bar which supports said plate in its initial position and lowers the casting during its vertical descent, quickly releasable means securing said chill plate and bar together, first guide means including a plurality of guide rolls below the mold discharge passage for guiding the casting in a vertical path as it descends, cooling means associated with said first guide means for cooling the casting and solidifying at least part of the molten metal in the core of said casting, pinch rolls below said first guide means for controlling the rate of descent of said casting, means for disconnecting the starter bar from the casting and attached chill plate while the casting continues to descend, bending means below the pinch rolls and including a plurality of rolls in a stationary frame adapted to contact one face of said casting and a plurality of rolls in a movable frame adapted to contact the opposite face of said casting for bending the casting and deflecting it from its downward path in a laterally extending direction, means for lowering the starter bar vertically after it has been released from the chill plate, second guide means for guiding the casting in a curved path from a generally vertical direction toward a generally horizontal direction, said second guide means including a fixed frame member and a movable frame member which is movable from a retracted position permitting vertical travel of the starter bar below the bending means to a normal operating position for receiving the casting as it descends below said bending means, said frame members having mounted therein a plurality of guide rolls adapted to contact the opposed faces of said casting and to guide said casting in the aforesaid curved path when said movable frame member is in normal operating position, and flexible and permanent cooling means associated with said second guide means for cooling and solidifying the casting.

2. Continuous metal casting apparatus comprising a generally vertical extending mold having an upper opening for the introduction of molten metal to form a casting and a lower discharge passage through which said casting may descend continuously as it is formed, first guide means including a plurality of guide rolls below this passage for guiding the casting in a vertical path as it descends, cooling means associated with said first guide means for cooling the casting and solidifying at least part of the molten metal in the core of said casting, pinch rolls below said first guide means for controlling the rate of descent of the casting, bending means below said pinch rolls and including a plurality of rolls in a stationary frame adapted to contact one face of said casting and a plurality of rolls in a movable frame adapted to contact the opposite face of said casting for bending the casting and deflecting it from its downward path in a laterally extending direction, second guide means for guiding the casting in a curved path from a generally vertical direction to a generally horizontal direction, said second guide means including a fixed frame member and a movable frame member located below the bending means and movable from a retracted position permitting vertical descent of a starter bar and a normal operating position for receiving the casting as it descends below the bending means, said frame members having mounted therein a plurality of guide rolls adapted to contact the opposed faces of said casting and to guide said casting in the aforesaid curved path when said movable frame member is in normal operating position, and cooling means associated with the second guide means for cooling and solidifying the casting.

3. Apparatus according to claim 2 wherein said second guide means comprises a movable rigid upper frame member which is pivotable about an axis remote from the upper end thereof, and a fixed rigid lower frame member located below said movable upper frame member.

4. Apparatus according to claim 2 wherein said second guide means comprises a horizontally reciprocable rigid frame comprising a plurality of guide rolls adapted to bear against the opposite faces of the casting, the axes of said guide rolls being arranged along two curved lines defining therebetween a curved path for the casting, and means for moving said frame from said first position to said second position.

5. Apparatus according to claim 2 wherein said second guide means comprises a fixed rigid frame having a first plurality of rolls adapted to bear against one face of the casting, the axes of said rolls being arranged along a curved line on one side of the path of the casting, and a horizontally reciprocable rigid frame having a second plurality of rolls adapted to bear against the opposite face of the casting, the axes of said last-mentioned rolls being arranged along a second curved line on the opposite side of the path of said casting from said first curved line, said reciprocable frame being movable from a retractable position permitting vertical descent of said starter bar below said bending means to a normal operating position in which said fixed frame and said reciprocable frame together define a curver path for the casting.

6. Apparatus according to claim 2 wherein said second guide means comprises a plurality of sections each having a pair of opposed guiderolls adapted to contact the opposite faces of the casting, means for flexibly connecting each of said sections to the adjacent section, the uppermost of said sections being fixedly located below the bending means so as to receive the starter bar and casting as these descend below the bending means, the lower end of said second guide means being laterally movable between a retracted position providing a straight vertical path for the descent of the starter bar and a normal operating position defining a curved path for descent and guiding of the casting.

7. Continuous metal casting apparatus including a generally vertically extending mold having an upper opening for the introduction of molten metal to form a casting and a lower discharge passage through which said casting may descend continuously as it is formed, bending means below said mold for bending the casting and deflecting it from its downward path in a vertically extended direction, a chill plate for closing said discharge passage initially and for providing a surface on which the molten metal initially solidifies to form the end of the casting with said plate attached thereto, a vertically movable starter bar which supports said plate in its initial position, said starter bar having an interior space near its upper end and quickly releasable means located entirely within said interior space for securing the chill plate and bar together, and actuating means located exteriorly of said starter bar between said mold and said bending means, said actuating means including a reciprocable striker element for releasing said bar from said chill plate and casting before the chill plate reaches the bending means, so as to permit the casting to be bent by the bending means and to permit the starter bar to continue its vertically downward travel after separation of the plate therefrom.

8. Apparatus according to claim 7 in which said actuating means is automatically responsive to the downward movement of the starter bar for releasing said bar from said chill plate when said starter bar reaches a predetermined elevation.

9. Casting guide means for a continuous metal casting apparatus including a generally vertically extending mold having an upper opening for the introduction of molten metal to form a casting and a lower discharge passage through which said casting may descend continuously as it is formed, bending means below said mold for bending the casting and deflecting it from its downward path in a vertically extending direction and a starter bar for closing said discharge passage initially and for lowering the casting in its travel to said bending means, said casting guide means comprising a rigid frame having journaled therein a plurality of guide rolls adapted to bear against the opposite faces of said casting, the axes of said guide rolls being arranged along a pair of curved lines defining a curved path for the casting therebetween, at least a portion of the rigid frame being movable from a retracted position permitting vertical descent of said starter bar and a normal operating position wherein said frame is adapted to receive the casting from said bending means, and cooling means including a plurality of spray nozzles supported by said frame for directing cooling water against the casting.

10. Casting guide means according to claim 9 wherein a portion of said rigid frame is reciprocable in a direction transverse to the direction of travel of the casting from said retracted position to said normal operating position.

11. Casting guide means for a continuous metal casting appartus including a generally vertically extending mold having an upper opening for the introduction of molten metal to form a casting and a lower discharge passage through which said casting my descend continuously as it is formed, bending means below said mold for bending the casting and deflecting it from its downward path in a vertically extending direction and a starter bar for closing said discharge passage initially and for lowering the casting in its travel to said bending means, said casting guide means comprising a rigid frame having a plurality of rolls adapted to bear against the opposite faces of said casting, the axes of said rolls being arranged along a pair of curved lines defining a path for the casting therebetween, said frame being pivotable about an axis remote from the upper end thereof from a retracted position wherein said frame permits vertical descent of said starter bar, and a normal operating position wherein said frame is adapted to receive said casting from said bending means, and cooling means including a plurality of spray nozzles supported by said frame for directing cooling water against the casting.

12. In continuous metal casting apparatus, bending means for deflecting a vertically descending casting in a laterally extending direction, said bending means comprising a stationary member having a first plurality of guide rolls and a movable member having a second plurality of guide rolls, said movable member having a first position permitting vertical travel of a starter bar and a second position in which the guide rolls in said movable member deflect the casting from its downward path in a laterally extending direction, and casting guide means located below said bending means, said casting guide means comprising a rigid frame having journaled therein a plurality of guide rolls adapted to bear against the opposite faces of said casting, the axes of said guide rolls being arranged along a pair of curved lines defining a curved path for the casting therebetween, at least a portion of the rigid frame being movable from a retracted position permitting vertical descent of said starter bar and a normal operating position wherein said frame is adapted to receive the casting from said bending means, and cooling means including a plurality of spray nozzles supported by said frame for directing cooling water against the casting.

13. The apparatus of claim 1 wherein said casting guide means is located immediately below said bending means so that the casting is continuously supported as it descends from the bending means to the casting guide means.

14. Continuous metal casting apparatus including a generally vertically extending mold having an upper opening for the introduction of molten metal to form a casting and a lower discharge passage through which said casting may descend continuously as it is formed, bending means below said mold for bending the casting and deflecting it from its downward path in a vertically extending direction, a chill plate for closing said passage initially and for providing a surface on which the molten metal initially solidifies to form the end of the casting with said plate attached thereto, a vertically movable starter bar which supports said plate in its initial position, said starter bar having position indicating means thereon, quickly releasable means securing the chill plate and bar together, and actuating means for releasing said bar from said chill plate and casting before the chill plate reaches the bending means, so as to permit the casting to be bent by the bending means and to permit the starter bar to continue its vertically downward travel after separation of the plate therefrom, said actuating means comprising a fluid actuated cylinder having a double acting piston and a piston rod extending externally thereof in one direction, said piston rod being adapted to engage said quickly releasable means securing the plate and bar together and thereby release said bar from said plate, a solenoid operated valve for controlling the admission of fluid to said cylinder, a position responsive element having a switch connected thereto and adapted to be moved so as to close said switch when said position indicating means on the starter bar reaches a predetermined elevation, and electrical circuit means adapted to energize said solenoid operated valve in response to closure of said switch and thereby cause the movement of said piston rod to the position for releasing said plate from said starter bar.

15. Continuous metal casting apparatus comprising a generally vertically extending mold having an upper opening for the introduction of molten metal to form a casting and a lower discharge passage through which said casting may descend continuously as it is formed, first guide means including a plurality of guide rolls below this passage for guiding the casting in a vertical path as it descends, cooling means associated with said first guide means for cooling the casting and solidifying at least part of the molten metal in the core of said casting, pinch roll means below said first guide means for controlling the rate of descent of the casting, second guide means for guiding the casting in a curved path from a generally vertical direction to a generally horizontal direction, said second guide means including a fixed frame member and a movable frame member located below the pinch roll means and movable from a retracted position permitting vertical descent of a starter bar and a normal operating position for receiving the casting as it descends below the pinch roll means, said frame members having mounted therein a plurality of guide rolls adapted to contact the opposed faces of said casting and to guide said casting in the aforesaid curved path when said movable frame member is in normal operating position, and cooling means associated with the second guide means for cooling and solidifying the casting.

References Cited

UNITED STATES PATENTS

| | | | |
|---|---|---|---|
| 648,091 | 5/1900 | Trotz | 22—57.2 XR |
| 1,267,839 | 5/1918 | Bernheim | 193—36 |
| 2,698,467 | 1/1955 | Tarquinee et al. | 22—57.2 |
| 2,732,053 | 1/1956 | McLaughlin | 193—36 |
| 2,920,359 | 1/1960 | Easton et al. | 22—57.2 |
| 3,239,894 | 3/1966 | Masters et al. | 22—57.2 |

FOREIGN PATENTS

| | | |
|---|---|---|
| 173,289 | 12/1952 | Austria. |
| 729,359 | 5/1955 | Great Britain. |
| 900,734 | 7/1962 | Great Britain. |
| 941,290 | 11/1963 | Great Britain. |

J. SPENCER OVERHOLSER, *Primary Examiner.*

MARCUS U. LYONS, *Examiner.*

R. A. SANDLER, R. S. ANNEAR, *Assistant Examiners.*